United States Patent
Moriwaki (10) Patent No.: US 8,427,707 B2
(45) Date of Patent: Apr. 23, 2013

(54) IMAGE PROCESSING APPARATUS AND CONTROL METHOD THEREOF

(75) Inventor: Daisaku Moriwaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 968 days.

(21) Appl. No.: 12/391,614

(22) Filed: Feb. 24, 2009

(65) Prior Publication Data

US 2009/0225373 A1    Sep. 10, 2009

(30) Foreign Application Priority Data

Mar. 5, 2008   (JP) .................. 2008-055089

(51) Int. Cl.
 *G06T 5/00* (2006.01)
(52) U.S. Cl.
 USPC ............ 358/3.27; 358/298; 358/1.9; 358/2.1; 358/3.24; 358/462; 358/463
(58) Field of Classification Search .................. 358/3.27, 358/298, 1.9, 2.1, 3.24, 462, 463
 See application file for complete search history.

(56) References Cited

U.S. PATENT DOCUMENTS

| | | | |
|---|---|---|---|
| 4,847,641 A | 7/1989 | Tung | 347/131 |
| 5,465,157 A * | 11/1995 | Seto et al. | 358/3.15 |
| 6,693,752 B2 * | 2/2004 | Azumai | 359/896 |

FOREIGN PATENT DOCUMENTS

| | | | |
|---|---|---|---|
| JP | 06-000992 A | 1/1994 | |
| JP | 10-042141 A | 2/1998 | |

OTHER PUBLICATIONS

Office Action which issued on Nov. 11, 2011, in counterpart Japanese application No. 2008-055089.

* cited by examiner

*Primary Examiner* — Twyler Haskins
*Assistant Examiner* — Michael Burleson
(74) *Attorney, Agent, or Firm* — Fitzpatrick, Cella, Harper & Scinto (57) ABSTRACT

A reference area is extracted from image data, and from the pixels included in the reference area, extracted are a plurality of small sections in which pixels are arranged so as to be symmetrical with respect to the center pixel of the reference area in the horizontal and vertical directions, and point-symmetrical with respect to the center pixel, while overlap of pixels is allowed between each of the small sections. Determination is made as to whether or not image data included in the reference area matches a predetermined pattern. A characteristic of the image data in the reference area is determined based on a number of characteristics of the plurality of small sections. Based on the results of the determination, it is judged whether or not to perform smoothing on the center pixel of the reference area. Then, the smoothing is performed on the judged center pixel.

3 Claims, 8 Drawing Sheets

■ : BLACK PIXEL
☐ : WHITE PIXEL
▨ : DON'T CARE AREA

NON-HALFTONE AREA DETERMINATION RULE
○ (X1)=(X2)=(X5)=0
○ AT LEAST ONE OF (Y1) TO (Y8), (X3), AND (X4) IS "0"

TARGET PIXEL BECOMES CORRECTION TARGET PIXEL IF REFERENCE AREA MATCHES DICTIONARY AND IS DETERMINED TO BE NON-HALFTONE AREA

FIG. 5A

■ : BLACK PIXEL
□ : WHITE PIXEL
▨ : DON'T CARE AREA

FIG. 5B

NON-HALFTONE AREA DETERMINATION RULE
○ (X2)=(X7)=(X8)=0
○ AT LEAST ONE OF (Y1) TO (Y8), (X5), AND (X6) IS "0"

TARGET PIXEL BECOMES CORRECTION TARGET PIXEL IF REFERENCE AREA MATCHES DICTIONARY AND IS DETERMINED TO BE NON-HALFTONE AREA

■ : BLACK PIXEL
□ : WHITE PIXEL
▨ : DON'T CARE AREA

FIG. 6B

NON-HALFTONE AREA DETERMINATION RULE
○ (X3)=(X4)=(X8)=0
○ AT LEAST ONE OF (Y1) TO (Y8), (X1), AND (X2) IS "0"

TARGET PIXEL BECOMES CORRECTION TARGET PIXEL IF REFERENCE AREA MATCHES DICTIONARY AND IS DETERMINED TO BE NON-HALFTONE AREA

■ : BLACK PIXEL
☐ : WHITE PIXEL
▨ : DON'T CARE AREA

FIG. 7B

NON-HALFTONE AREA DETERMINATION RULE
○ (X3)=(X5)=(X6)=0
○ AT LEAST ONE OF (Y1) TO (Y8), (X7), AND (X8) IS "0"

TARGET PIXEL BECOMES CORRECTION TARGET PIXEL IF REFERENCE AREA MATCHES DICTIONARY AND IS DETERMINED TO BE NON-HALFTONE AREA

IMAGE PROCESSING APPARATUS AND CONTROL METHOD THEREOF

BACKGROUND OF THE INVENTION

1. Field of the Invention

The present invention relates to an image processing apparatus which determines whether or not to perform smoothing in accordance with the state of a target pixel and its peripheral area and performs smoothing on the target pixel, and a control method of the image processing apparatus.

2. Description of the Related Art

Recently, in the field of image forming apparatuses using electrophotography, various smoothing methods for jaggy correction of an outline, using oversampling or replacement by pattern matching and the like, have been considered.

In the smoothing method of replacing a pixel using pattern matching, a plurality of pixels in the neighborhood of a target pixel are referred, and if the pattern consisting of these plural pixels is a predetermined pattern, correction is executed on the target pixel subjected to forming. According to this method, if the reference area taken from the neighborhood of the target pixel is small, for instance, it is possible to recognize that the target pixel is a part of a curved line, but it is impossible to recognize what curvature the curved line has. Particularly since an outline close to a horizontal or vertical line cannot be detected, it is impossible to perform appropriate correction in accordance with a curvature of the outline. To perform the most appropriate correction in accordance with a curvature of an outline, it is necessary to take a relatively large reference area. However, if pattern matching is to be performed entirely on the large reference area, the size of the comparison circuit will be enlarged, resulting in a high cost.

In the technique disclosed in U.S. Pat. No. 4,847,641, only part of a reference target area is compared with a matching pattern and the remaining portion is disregarded. According to this method, while a large reference target area is taken, the area to be actually compared with a matching pattern is limited to a portion, thereby making it possible to keep the circuit size small. However, since the entire reference target area is not referred in pattern matching, in a case of a halftone image or in a case where pixels are dense, image quality may deteriorate as a result of correction.

In the technique disclosed in U.S. Pat. No. 5,465,157, small sections each of which consisting of a plurality of pixels are extracted, and based on the state of the plurality of extracted small sections, it is determined whether the image is a halftone image or a dense image. According to this method, the aforementioned problem of image quality deterioration can be reduced.

Meanwhile, for a method of comparing a reference area with a matching pattern using a small circuit, a recently widespread technique is to execute the comparison while the matching pattern or the reference area is converted symmetrically with respect to horizontal, vertical, and rotational axes.

As mentioned above, image quality deterioration in halftone images or dense images can be reduced by a method or apparatus which makes use of characteristic reference of small sections. However, in these conventional techniques, when comparison is executed between a reference target pixel and a matching pattern utilizing a symmetric property, pixel array conversion is performed. In order to support the pixel array conversion, it is necessary to register and compare many characteristic patterns of small sections which are different from each another. For this reason, the circuit size may increase and comparison may not be performed efficiently.

SUMMARY OF THE INVENTION

An aspect of the present invention is to eliminate the above-mentioned problems of the conventional technology.

According to an aspect of the present invention, it is possible to efficiently perform smoothing without enlarging the circuit size.

According to an aspect of the present invention, there is provided an image processing apparatus comprising: an area extraction unit configured to extract a reference area from image data; an extraction unit configured to extract a plurality of small sections where pixels included in the reference area are arranged so as to be symmetrical with respect to a center pixel of the reference area in the horizontal and vertical directions, and point-symmetrical with respect to the center pixel, while overlap of pixels is allowed between each of the small sections; a pattern determination unit configured to determine whether or not image data included in the reference area matches a predetermined pattern; a characteristic determination unit configured to determine a characteristic of image data of the reference area based on a number of characteristics of the plurality of small sections extracted by the extraction unit; a judgment unit configured to judge whether or not to perform smoothing on the center pixel of the reference area based on results of determination determined by the pattern determination unit and the characteristic determination unit; and a correction processing unit configured to perform smoothing on the center pixel that has been judged by the judgment unit that smoothing is to be performed.

According to another aspect of the present invention, there is provided an image processing method, comprising: an area extracting step of extracting a reference area from image data; an extracting step of extracting a plurality of small sections where pixels included in the reference area are arranged so as to be symmetrical with respect to a center pixel of the reference area in the horizontal and vertical directions, and point-symmetrical with respect to the center pixel, while pixel overlap is allowed between each of the small sections; a pattern determining step of determining whether or not image data included in the reference area matches a predetermined pattern; a characteristic determining step of determining a characteristic of image data of the reference area based on a number of characteristics of the plurality of small sections extracted in the extracting step; a judging step of judging whether or not to perform smoothing on the center pixel based on results of determination determined in the pattern determining step and the characteristic determining step; and a correction processing step of performing smoothing on the center pixel that has been judged in the judging step that smoothing is to be performed.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
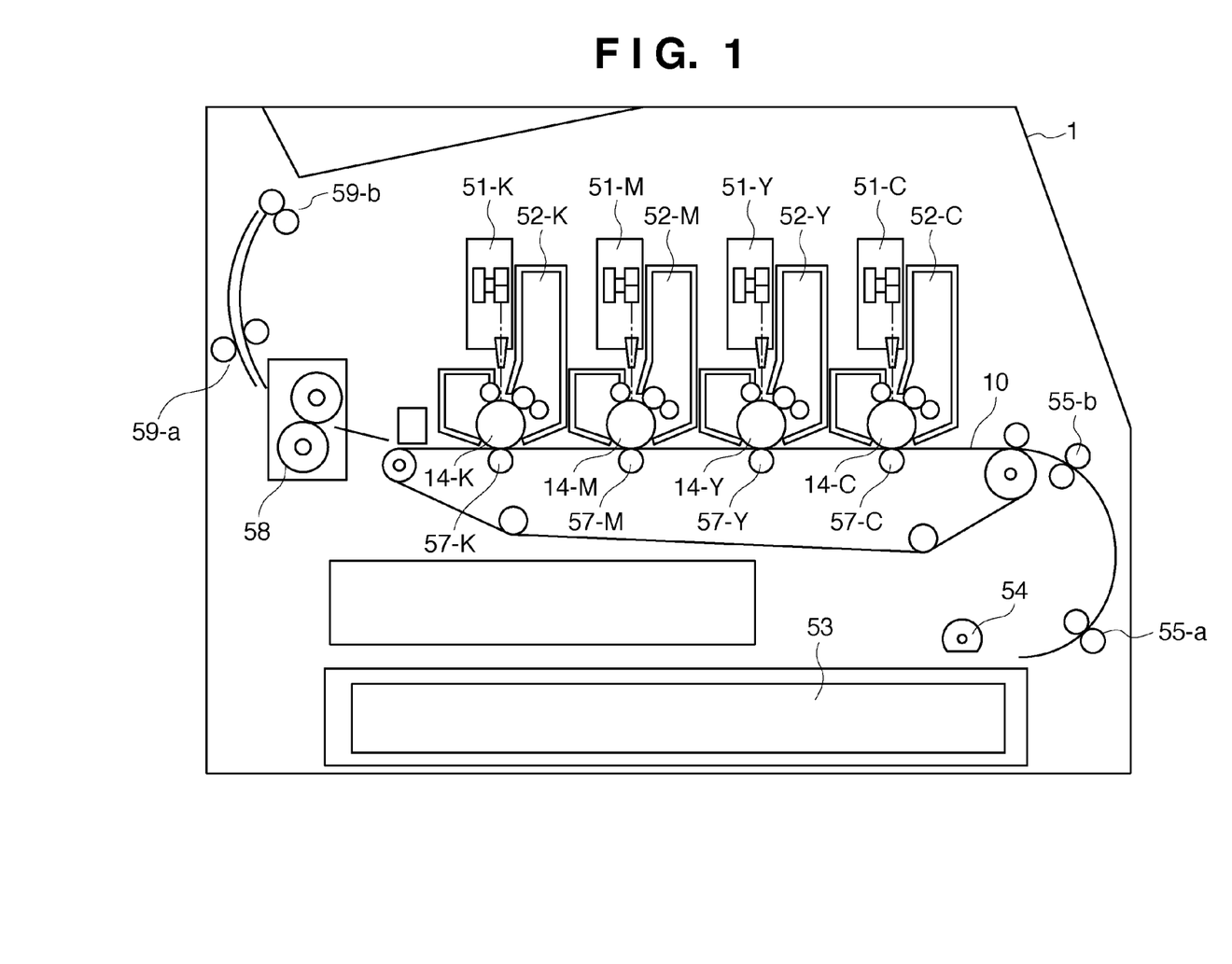
FIG. 1 depicts a schematic cross-section view illustrating a brief configuration of an image forming apparatus according to an exemplary embodiment.

FIG. 1 depicts a schematic cross-section view illustrating a brief configuration of an image forming apparatus according to an exemplary embodiment of the present invention. Described herein is a 4-drum color laser-beam printer 1. A photosensitive drum 14, a developing unit 52, a laser scanner 51, and a transfer member (transfer roller) 57 are provided for each color. The configuration corresponding to each color is indicated by the letter indicative of each color, for example, Y, M, C and K, attached to the reference number. In the following descriptions, when an operation common to respective colors is explained, letters indicative of colors, for example, Y, M, C and K are omitted and simply reference numerals are provided. Note herein that Y represents yellow, M represents magenta, C represents cyan, and K represents black.

The printer 1 has a sheet cassette 53 on the bottom part of the main body. A paper sheet (sheet) contained in the sheet cassette 53 is picked up one by one by rotation of a pickup roller 54, and transferred to an image forming section by rotation of pairs of conveyance rollers 55-a and 55-b. In the image forming section, a conveyance belt 10 is provided flat in the conveyance direction (from the right to the left in FIG. 1) for conveying the sheet by a plurality of rotation rollers, and in the most upstream part of the conveyance belt, the sheet is electrostatically attached to the conveyance belt 10. Four photosensitive drums 14-C, 14-Y, 14-M, and 14-K, serving as drum-shaped image carriers, are arranged opposite to the belt conveyance surface and constitute the image forming section.

The developing units 52-C, 52-Y, 52-M, and 52-K are provided for respective colors, which are cyan (C), yellow (Y), magenta (M), and black (K), and each unit comprises a photosensitive drum, a toner, a charger, and a developer. There is predetermined space between the charger and the developer in the body of each developing unit 52. Through the space, a laser beam which is emitted in accordance with an image signal corresponding to each color image from a laser scanner 51 is irradiated. Before the laser beam is irradiated, the surface of the photosensitive drum 14 has been uniformly charged with a predetermined electric charge by the charger. The laser scanner 51 exposes the surface of the uniformly charged photosensitive drum 14 in accordance with the image signal so as to form an electrostatic latent image corresponding to each color image, and the developer forms (develops) a toner image by transferring each color toner to the electrically potential part of the electrostatic latent image.

Transfer members (transfer rollers) 57-C, 57-Y, 57-M, and 57-K are arranged on the other side of the conveyance surface of the conveyance belt 10. The each color toner image formed (developed) on the surface of each photosensitive drum 14 is transferred to the sheet surface by a transfer electric field formed by the corresponding transfer member 57. The sheet, on which the each color toner image is transferred, is discharged outside the printer 1 by rotation of the pairs of discharge rollers 59-a and 59-b. Note that the transfer belt 10 may be of an intermediate transfer belt, on which cyan, yellow, magenta, and black toner images are overlapped and the toner image on the intermediate transfer belt is secondarily transferred to a sheet. Numeral 58 denotes a fixing unit for fixing the toner image which has been transferred to a sheet.

Note, in FIG. 1, the cyan image forming unit comprises the laser scanner 51-C, developing unit 52-C, photosensitive drum 14-C, and transfer member 57-C. Similarly, the magenta image forming unit comprises the laser scanner 51-M, developing unit 52-M, photosensitive drum 14-M, and transfer member 57-M. The yellow image forming unit comprises the laser scanner 51-Y, developing unit 52-Y, photosensitive drum 14-Y, and transfer member 57-Y. The black image forming unit comprises the laser scanner 51-K, developing unit 52-K, photosensitive drum 14-K, and transfer member 57-K.

Figure 2A:
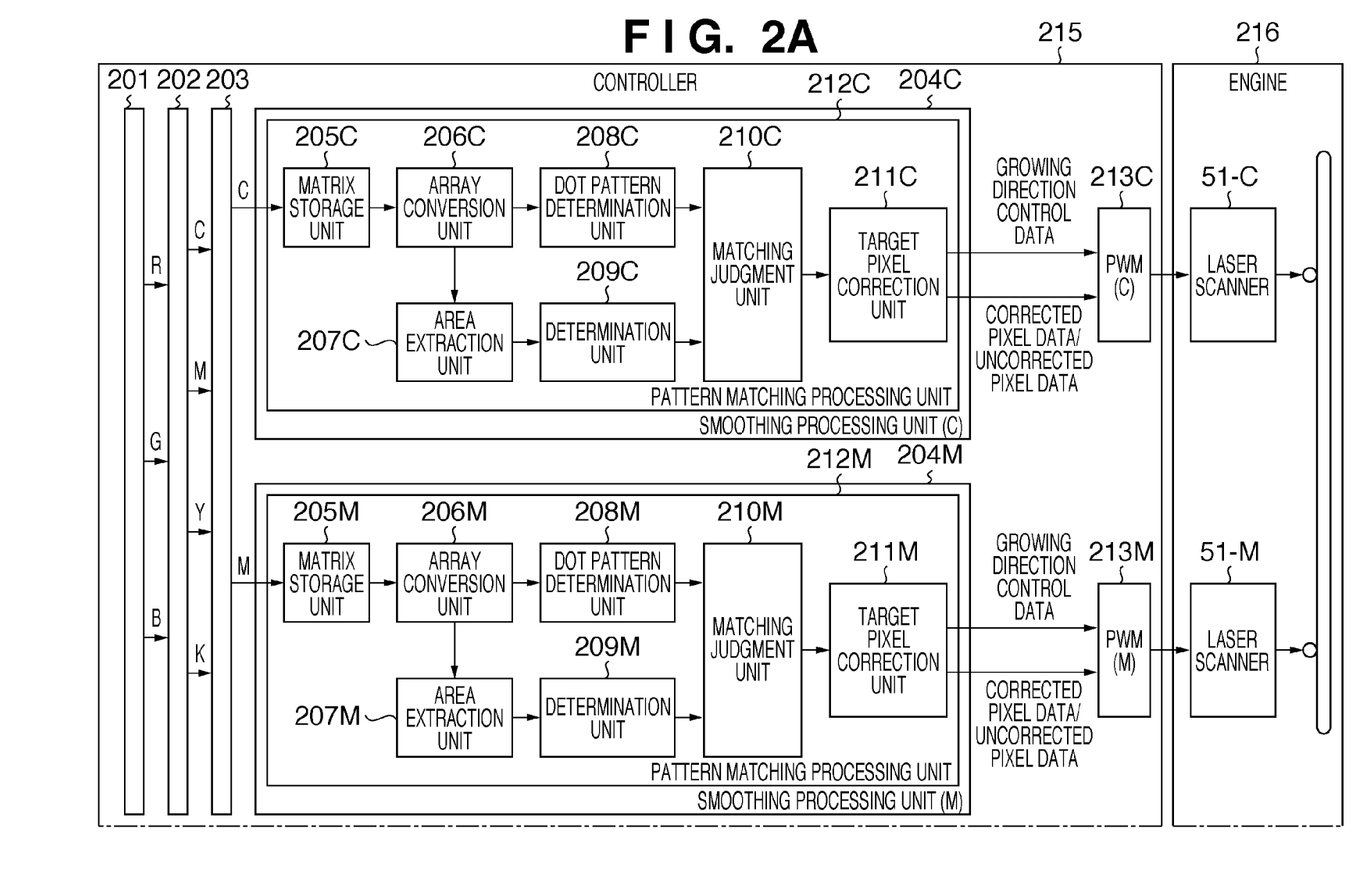
FIGS. 2A and 2B are functional block diagrams describing operation of smoothing executed in the printer according to the embodiment.
Figure 2B:
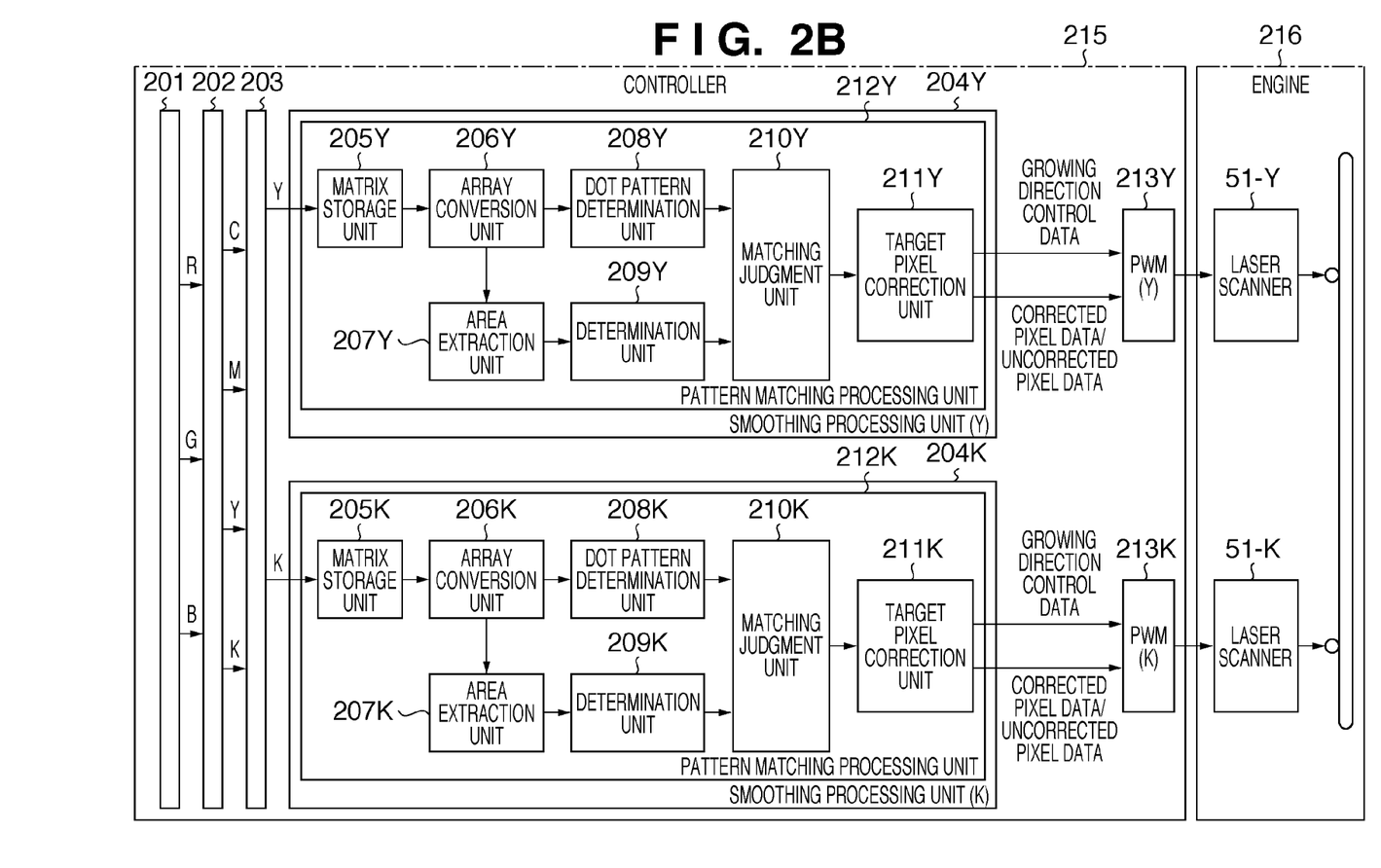

FIGS. 2A and 2B are functional block diagrams describing operation of smoothing executed by an image processing unit of the printer 1 according to the exemplary embodiment.

A printer engine 216 forms (prints) an image based on image data generated by a controller 215. An image generation unit 201 generates raster image data that can be printed based on print data received from a computer (not shown) which is an external apparatus, and outputs the data as RGB data. A color conversion unit 202 converts the RGB data to CMYK data which can be printed by the printer engine 216 in CMYK space. A halftone processing unit 203 performs digital halftoning on the CMYK data.

Smoothing processing units 204C, 204M, 204Y, and 204K execute smoothing on CMYK data respectively. As the smoothing processing units for respective colors have the same configuration, hereinafter the smoothing processing unit 204C which performs smoothing on cyan data is described as a typical unit.

A pattern matching processing unit 212C determines a dot pattern of a reference area which includes a target pixel neighborhood, and determines the characteristic of the dot pattern. The pattern matching processing unit 212C then outputs corrected pixel data on which smoothing correction has been executed, or uncorrected pixel data, and growing direction control data for controlling the growing direction of a PWM signal. A matrix storage unit 205C extracts from the image data a plurality of pixels to be used as a reference area, receives pixel data corresponding to the reference area, on which digital halftoning has been performed by the halftone processing unit 203, and temporarily stores the data. An array conversion unit 206C converts a pixel data array stored in the matrix storage unit 205C to arrays in which a plurality of pixels in the reference area are horizontally symmetrical, vertically symmetrical, and symmetrical with respect to a rotation axis. An area extraction unit 207C extracts small sections, such as the one shown in FIG. 3B, for determining a characteristic based on a matrix of the reference area on which array conversion has been performed by the array conversion unit 206C. The small sections are obtained by extracting pixels in the reference area while overlap of pixels is allowed between each of the small sections, and by arranging the extracted pixels so as to be horizontally and vertically symmetrical with respect to the center pixel 300 of the reference area (FIG. 3A) and point-symmetrical (rotationally symmetrical) with respect to the center pixel 300 (see FIG. 3B).

A dot pattern determination unit 208C inputs pixel data of the reference area, on which array conversion has been performed by the array conversion unit 206C, and determines whether or not the dot pattern of the reference area matches a predetermined pattern. A determination unit 209C determines, based on a characteristic of each small section obtained by the area extraction unit 207C, to which category the reference area belongs. A matching judgment unit 210C judges whether or not to perform correction on the target pixel (center pixel) of the matrix (reference area) based on the type of pattern of the reference area which has been determined by the dot pattern determination unit 208C and the characteristic of the small section which has been determined by the determination unit 209C. A target pixel correction unit 211C corrects the target pixel (center pixel) which has been determined that correction is necessary by the matching judgment unit 210C. The target pixel correction unit 211C outputs growing direction control data and the corrected or uncorrected target pixel data. A PWM unit 213C inputs the corrected pixel data on which smoothing correction has been performed, or uncorrected pixel data, and growing direction control data for controlling the growing direction of a PWM signal, and performs pulse-width modulation of the pixel data. Based on the PWM signal, the laser scanner 51-C is driven and a cyan image is formed. More specifically, the PWM unit 213C outputs a PWM signal corresponding to a pulse-width of the inputted pixel data. Further, the PWM unit 213C equally divides the size of the one-pixel into plural areas, and in accordance with the growing direction control data, controls to turn on or off the PWM signal depending on the area of the one pixel. For instance, if the growing direction is the left direction of the main-scanning direction, the PWM signal is controlled so that the dots are concentrated on the left side of the one pixel. If the growing direction is the right direction, the PWM signal is controlled so that the dots are concentrated on the right side of the one pixel.

Since operation of the smoothing processing units 204M, 204Y, and 204K as well as the PWM units 213M, 213Y, and 213K corresponding to other colors are similar, descriptions thereof are omitted.

Next, detailed descriptions are provided regarding the pattern matching processing unit 212C with reference to FIGS. 3A, 3B, 4A, 4B, 5A, 5B, 6A, 6B, 7A, and 7B. Since operation of the pattern matching processing units 212M, 212Y, and 212K for other colors are similar, descriptions thereof are omitted.

Figure 3A:
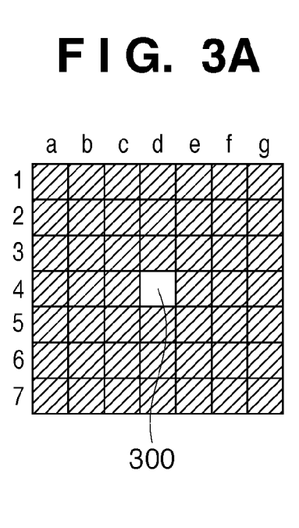
FIGS. 3A and 3B depict views explaining a basic concept of dot pattern characteristic determination executed on the entire area of a matrix area based on a matrix area, having 7 dots in the main-scanning direction and 7 dots in the sub-scanning direction, which is stored in a matrix storage area.
Figure 3B:
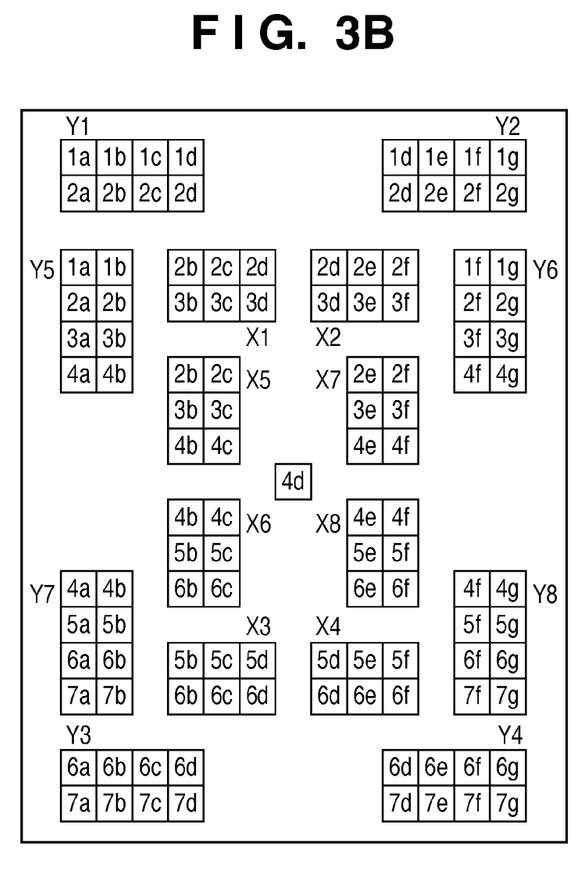

FIGS. 3A and 3B depict views illustrating a basic concept of dot pattern characteristic determination executed on the entire matrix area based on the matrix area, having 7 dots in the main-scanning direction and 7 dots in the sub-scanning direction, which is stored in the matrix storage area 205C. Based on the characteristic of the matrix area, whether or not the dot pattern is subjected to smoothing is determined.

FIG. 3A shows a reference area of the matrix having 7 dots in the main-scanning direction and 7 dots in the sub-scanning direction.

The 7×7 matrix, having 7 pixels (a, b, c, d, e, f, and g) in the main-scanning direction and 7 pixels (1, 2, 3, 4, 5, 6, and 7) in the sub-scanning direction, represent 49 pixels. For instance, the center pixel is expressed as 4d on the matrix. Assume that the center pixel is the target pixel 300 for smoothing. In the following description, each pixel of the reference area is expressed by coordinates of the matrix.

In FIG. 3B, the reference area shown in FIG. 3A is divided into 17 small sections consisting of X1 to X8 and Y1 to Y8 small sections and the center pixel (4d). The small section X1 is configured with the pixels 2b, 2c, 2d, 3b, 3c, and 3d in FIG. 3A. The small section X2 is configured with the pixels 2d, 2e, 2f, 3d, 3e, and 3f in FIG. 3A. The small section X3 is configured with the pixels 5b, 5c, 5d, 6b, 6c, and 6d in FIG. 3A. The small section X4 is configured with the pixels 5d, 5e, 5f, 6d, 6e, and 6f in FIG. 3A. The small section X5 is configured with the pixels 2b, 2c, 3b, 3c, 4b, and 4c in FIG. 3A. The small section X6 is configured with the pixels 4b, 4c, 5b, 5c, 6b, and 6c in FIG. 3A. The small section X7 is configured with the pixels 2e, 2f, 3e, 3f, 4e, and 4f in FIG. 3A. The small section X8 is configured with the pixels 4e, 4f, 5e, 5f, 6e, and 6f in FIG. 3A. As shown in FIG. 3B, each of the small sections Y1 to Y8 is also configured with 8 pixels in FIG. 3A.

As described above, the reference area shown in FIG. 3A can be divided into 8 small sections (X1 to X8) each of which is configured with 6 pixels, 8 small sections (Y1 to Y8) each of which is configured with 8 pixels, and the center pixel 4d.

Assume herein that the characteristic of each small section is expressed by (Xn) or (Yn).

In a case where all pixels in a small section are the same value (all pixels are white pixels or black pixels), the characteristic (Xn) or (Yn) of the small section is defined as 0.

In a case where pixels in a small section are different from one another (white pixels and black pixels are mixed), the characteristic (Xn) or (Yn) of the small section is defined as 1. For instance, if all pixels of the small section X1 are white pixels, then the characteristic (X1) of the small section X1 is 0. If all pixels of the small section X1 are black pixels, then the characteristic (X1) of the small section X1 is 0. If the pixels of the small section X1 are configured with white and black pixels, then the characteristic (X1) of the small section X1 is 1. A characteristic of each of the small sections X1 to X8 and Y1 to Y8 is obtained in the above-described manner.

FIGS. 4A and 4B to 7A and 7B show examples of pattern matching utilizing a symmetric property of a pattern according to the embodiment.

Figures 4A, 4B:
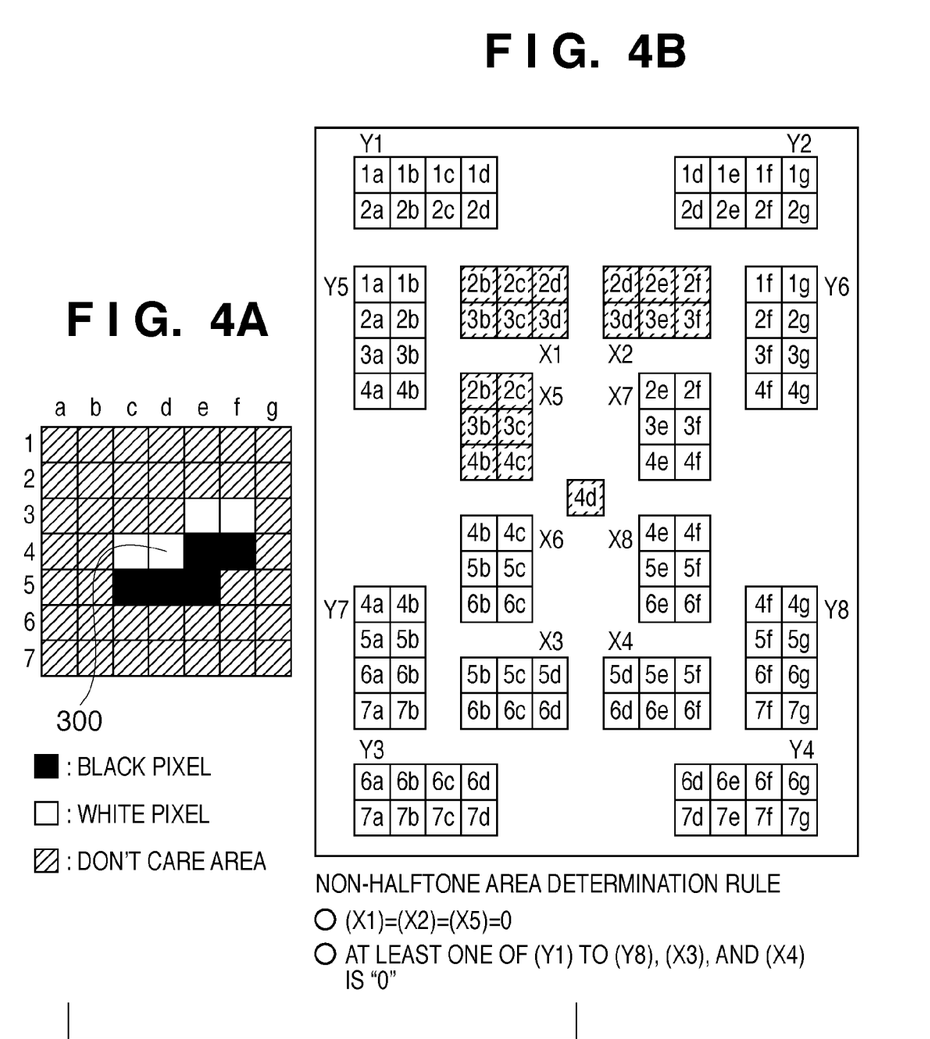
FIGS. 4A and 4B depict views showing an example of pattern matching utilizing a symmetric property of a pattern according to the embodiment.

FIG. 4A shows an example of a dot pattern of the reference area in the neighborhood of the target pixel (center pixel) 300.

In FIGS. 4A and 4B, the pixels 3e, 3f, 4c, and 4d are white, the pixels 4e, 4f, 5c, 5d, and 5e are black, and other pixels can either be white or black. Herein, the characteristic of small sections (X1)=(X2)=(X5)=(4d)=0 stands, and at least one of the characteristics (Y1) to (Y8), (X3), and (X4) is 0. If a pattern of this kind is detected, then the reference area (FIG. 4A) is determined as a non-halftone area, and the target pixel 300 becomes the correction target.

FIGS. 5A and 5B to FIGS. 7A and 7B show dot patterns and characteristics of small sections which are rotated 90°, 180°, and 270° respectively to the right, with the target pixel 300 as the center, from the dot pattern in FIG. 4A and the characteristic of small sections in FIG. 4B.

Figures 5A, 5B:
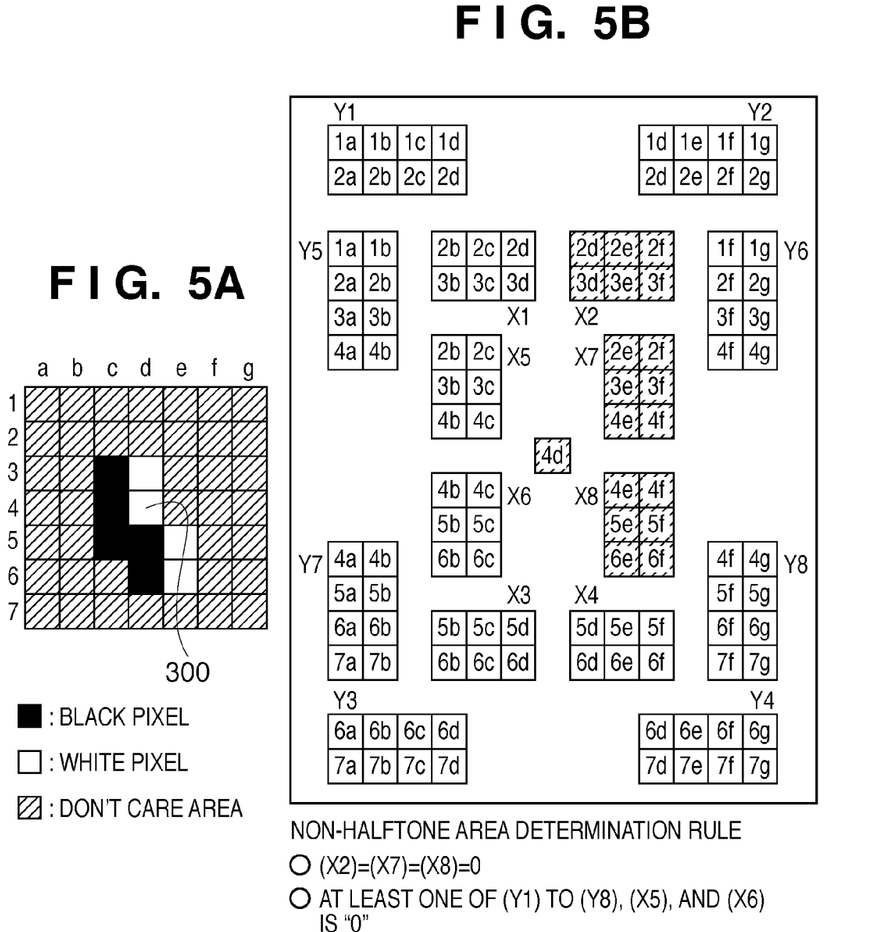
FIGS. 5A and 5B depict views illustrating a dot pattern of FIG. 4A and a characteristic of small sections in FIG. 4B, which have been rotated 90° to the right.

More specifically, in FIGS. 5A and 5B, the pixels 3d, 4d, 5e, and 6e are white, the pixels 3c, 4c, 5c, 5d, and 6d are black, and other pixels can either be white or black. Herein, the characteristic of small sections (X2)=(X7)=(X8)=(4d)=0 stands, and at least one of the characteristics (Y1) to (Y8), (X5), and (X6) is 0. If a pattern of this kind is detected, then the target pixel 300 becomes the correction target.

Figure 6A:
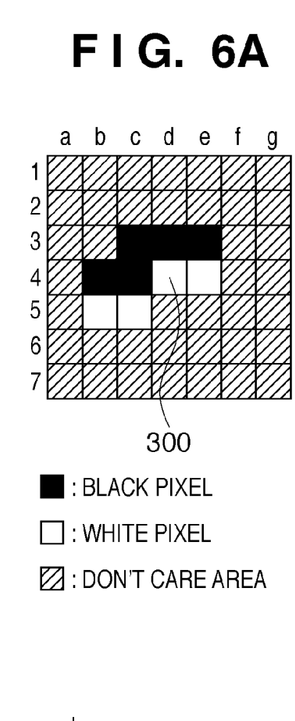
FIGS. 6A and 6B depict views illustrating a dot pattern of FIG. 4A and a characteristic of small sections in FIG. 4B, which have been rotated 180° to the right.
Figure 6B:
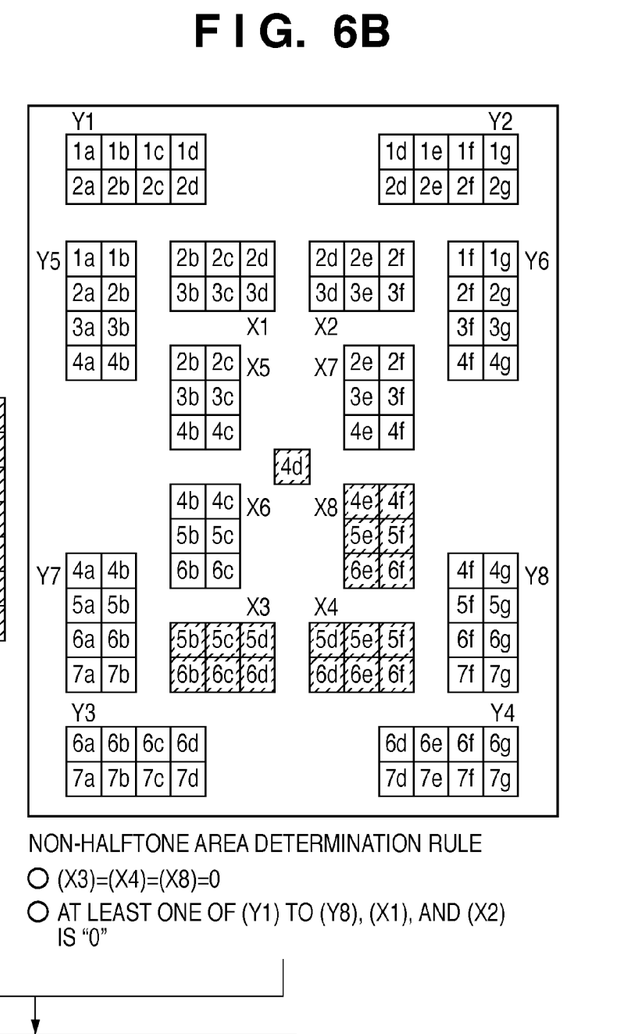

In FIGS. 6A and 6B, the pixels 4d, 4e, 5b, and 5c are white, the pixels 3c, 3d, 3e, 4b, and 4c are black, and other pixels can either be white or black. Herein, the characteristic of small sections (X3)=(X4)=(X8)=(4d)=0 stands, and at least one of the characteristics (Y1) to (Y8), (X1), and (X2) is 0. If a pattern of this kind is detected, then the target pixel 300 becomes the correction target.

Figure 7A:
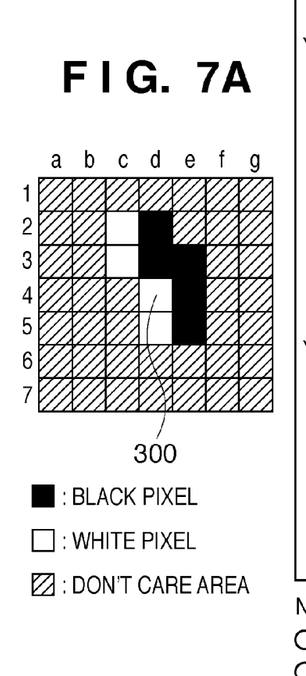
FIGS. 7A and 7B depict views illustrating a dot pattern of FIG. 4A and a characteristic of small sections in FIG. 4B, which have been rotated 270° to the right.
Figure 7B:
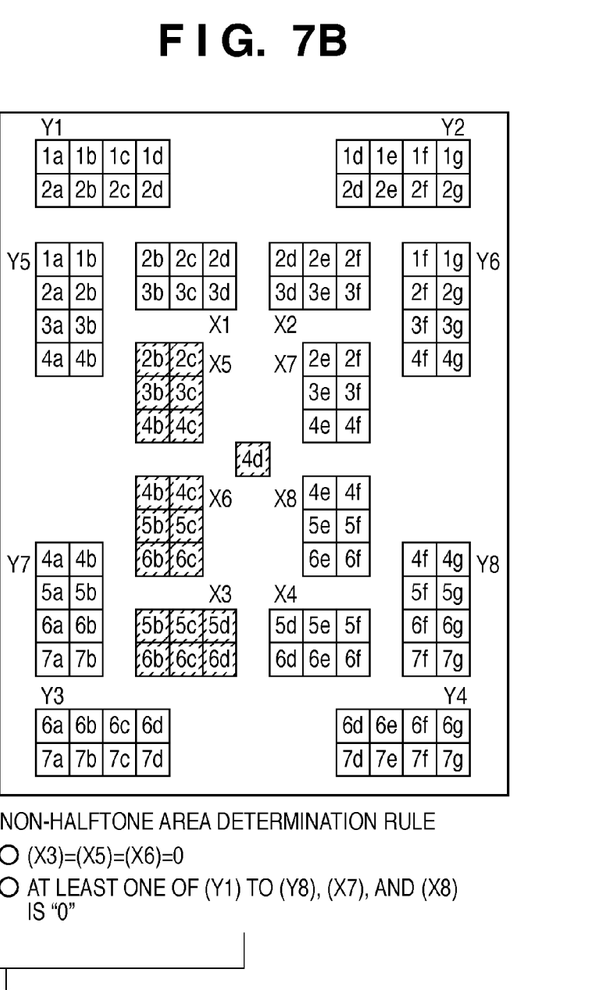

In FIGS. 7A and 7B, the pixels 2c, 3c, 4d, and 5d are white, the pixels 2d, 3d, 3e, 4e, and 5e are black, and other pixels can either be white or black. Herein, the characteristic of small sections (X3)=(X5)=(X6)=(4d)=0 stands, and at least one of the characteristics (Y1) to (Y8), (X7), and (X8) is 0. If a pattern of this kind is detected, then the target pixel 300 becomes the correction target.

Referring back to FIGS. 2A and 2B, the dot pattern determination unit 208C, determination unit 209C, and matching judgment unit 210C compare the 7×7 matrix area with the total of 8 patterns, including FIGS. 4A and 4B to FIGS. 7A and 7B and the patterns and characteristics that are vertically or horizontally symmetrical to them. If the matching judgment unit 210C judges that the dot pattern of the matrix area satisfies one of the conditions of the above-described 8 patterns, then the target pixel 300 of the reference area is determined to be the correction target pixel and subjected to correction by the target pixel correction unit 211C. The correction in the target pixel correction unit 211C is executed by, for instance, equally dividing the size of one pixel into four areas in the main-scanning direction, obtaining information indicative of whether or not a dot is to be added to each of the four areas, and outputting the corrected image data, to which the obtained information is added, to the PWM unit 213C. In accordance with, for instance, the pixel value or the above-described information, the PWM unit 213C controls whether or not to attach toner (dot) to each of the four areas of one pixel.

According to the present embodiment described above, whether or not to add a dot can be controlled in units of each area, which is obtained by equally dividing the size of one pixel. Therefore, even in an image of a non-halftone area, a jaggy portion which appears on the outline of the image can be corrected.

According to the present embodiment described above, by virtue of array conversion executed by the array conversion unit, dots in a matrix area can be compared with the pattern and characteristic in FIG. 4A in eight different comparison methods. Therefore, there is no need to register the rest of 7 patterns and characteristics.

The conventional technique did not consider utilizing a symmetric property of a dot pattern when simultaneously executing dot pattern comparison and characteristic determination of an area.

On the other hand, according to the present embodiment, in dividing a 7×7 matrix area into small sections for executing characteristic determination on all sections of the 7×7 matrix area, the area is divided into small sections (FIG. 3B) which have a symmetric property in the horizontal, vertical, and rotational directions, while pixel overlap in the reference area is allowed between each of the small sections. By virtue of the symmetric property between the small sections, it is possible to perform, with a simple configuration, comparison and determination utilizing the symmetric property.

In registration of all matching patterns subjected to the processing, with regard to the plurality of patterns having a symmetric property, only the pattern that serves as a base of the symmetry is registered. Therefore, the number of patterns to be registered can largely be reduced.

In the above-described embodiment, array conversion is performed on the matrix area, and determination processing utilizing a symmetric property is performed. However, the embodiment may be configured in a way that array conversion is performed on the pattern used in comparison, instead of converting the matrix area.

Furthermore, in the above-described embodiment, the target pixel is corrected utilizing a 7×7 matrix serving as a reference area. However, the present invention is not limited to this size of the reference area.

Furthermore, the above-described embodiment performs characteristic determination by dividing the reference area into 17 small sections so that each of the sections has a symmetric property. However, besides the symmetric property, the number and shape of the small sections are not limited to the aforementioned embodiment.

Furthermore, the above-described embodiment performs characteristic determination on a section, which is smaller than the reference area, by whether or not all pixels of the small section are the same. However, the characteristic determination technique is not limited to this. In a case of binary pixel data, for instance, the rate the number of black pixels in a section accounts for in the entire small section may be taken as a character, or in a case of multi-valued pixel data, the rate the number of pixels exceeding a threshold value accounts for in the small section may be taken as a character.

Furthermore, in the above-described embodiment, smoothing is performed on the pixel data on which digital halftoning has been performed. However, the processing order is not limited to this. In other words, smoothing may be performed on multi-valued pixel data before digital halftoning is performed.

Furthermore, in the above-described embodiment, smoothing is performed on the binary pixel data on which digital halftoning has been performed. However, smoothing is not limited to binary data, but may be performed on multi-value data such as three-valued data or four-valued data.

Although the above-described embodiment has given an example of applying the present invention to a multi-color data printing apparatus, the present invention may be applied to an apparatus performing single-color data printing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-055089 filed Mar. 5, 2008, which is hereby incorporated by reference herein in its entirety.

What is claimed is:

1. An image processing apparatus comprising:
an area extraction unit configured to extract a reference area from image data;
an extraction unit configured to extract a plurality of small sections which may overlap and arrange the plurality of small sections such that for every first small section,
there is a second small section that is different from the first small section and symmetrical to the first small section with respect to a center pixel of the reference area in the horizontal direction,
there is a third small section that is that is different from the first and second small sections and symmetrical to the first small section with respect to the center pixel in the vertical direction, and there is a fourth small section that is different from the first through third small sections and is symmetrical to the first small section with respect to the center pixel in a rotational direction;

a pattern determination unit configured to compare image data included in the reference area with
- a predetermined first pattern,
- a second pattern that is symmetrical in a horizontal direction to the first pattern,
- a third pattern that is symmetrical in a vertical direction to the first pattern, and
- a fourth pattern that is symmetrical in a rotational direction to the first pattern;

a determination unit configured to determine whether the result of the comparison by said pattern determination unit corresponding to each of the first through fourth patterns satisfies a predetermined condition; and a correction processing unit configured to perform smoothing on the center pixel of the reference area in a case in which it is determined by said determination unit that the result satisfies the predetermined condition.

2. An image processing method, comprising:

an area extracting step of extracting a reference area from image data;

an extracting step of extracting a plurality of small sections which may overlap and arranging the plurality of small sections such that for every first small section,
- there is a second small section that is different from the first small section and symmetrical to the first small section with respect to a center pixel of the reference area in the horizontal direction,
- there is a third small section that is different from the first and second small sections and symmetrical to the first small section with respect to the center pixel in the vertical direction, and
- there is a fourth small section that is different from the first through third small sections and is symmetrical to the first small section with respect to the center pixel in a rotational direction;

a pattern determining step of comparing image data included in the reference area with
- a predetermined first pattern,
- a second pattern that is symmetrical in a horizontal direction to the first pattern,
- a third pattern that is symmetrical in a vertical direction to the first pattern, and
- a fourth pattern that is symmetrical in a rotational direction to the first pattern;

a determining step of determining whether the result of the comparison in said pattern determining step corresponding to each of the first through fourth patterns satisfies a predetermined condition; and a correction processing step of performing smoothing on the center pixel of the reference area in a case in which it is determined in said determining step that the result satisfies the predetermined condition.

3. A non-transitory computer-readable storage medium storing a program for causing a computer to implement the image processing method according to claim 2.

* * * * *